(12) United States Patent
Isobe

(10) Patent No.: US 11,249,706 B2
(45) Date of Patent: Feb. 15, 2022

(54) INFORMATION PROCESSING APPARATUS, COMPUTER READABLE MEDIUM STORING INFORMATION PROCESSING PROGRAM, AND THREE-DIMENSIONAL MODELING SYSTEM

(71) Applicant: FUJIFILM BUSINESS INNOVATION CORP., Tokyo (JP)

(72) Inventor: Kimihiko Isobe, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 22 days.

(21) Appl. No.: 16/847,714

(22) Filed: Apr. 14, 2020

(65) Prior Publication Data

US 2021/0141580 A1 May 13, 2021

(30) Foreign Application Priority Data

Nov. 13, 2019 (JP) .............................. JP2019-205692

(51) Int. Cl.
*G06F 3/12* (2006.01)
*B29C 64/386* (2017.01)
(Continued)

(52) U.S. Cl.
CPC .......... *G06F 3/1261* (2013.01); *B29C 64/386* (2017.08); *B33Y 50/00* (2014.12);
(Continued)

(58) Field of Classification Search
CPC .... G05B 2219/49023; G05B 19/40932; G06F 3/1205; G06F 3/1261; B29C 64/386; B33Y 50/00
See application file for complete search history.

(56) References Cited

U.S. PATENT DOCUMENTS 6,413,360 B1   7/2002  Morita et al.
7,072,949 B1 *  7/2006  Safko ..................... G06Q 30/02
                                                    705/26.5
(Continued)

FOREIGN PATENT DOCUMENTS

JP    2004295602 A  * 10/2004
JP    2017-111397 A    6/2017
(Continued)

OTHER PUBLICATIONS

Ota, Printing information managing device and printing system provided with same, and computer program for managing printing information, 2019, google patents, 1-14 (Year: 2019), (machine translation of JP-2019012419-A).*

(Continued)

*Primary Examiner* — Darrin D Dunn
*Assistant Examiner* — Yvonne Trang Follansbee
(74) *Attorney, Agent, or Firm* — Oliff PLC

(57) ABSTRACT

An information processing apparatus includes a processor, and the processor is configured to acquire, in printing processing for modeling a three-dimensional modeled object by forming respective images on recording media and stacking the recording media, a print job including at least one of two-dimensional image data for forming a two-dimensional image and three-dimensional image data for modeling a three-dimensional modeled object, an instruction of a user for the print job, and attribute information of a plurality of printing apparatuses that are candidates to perform the print job, and select a printing apparatus to perform the acquired print job from the plurality of printing apparatuses based on whether the image data contained in the print job is two-dimensional image data or three-dimensional image data, the attribute information, and the instruction of the user.

17 Claims, 14 Drawing Sheets

(51) Int. Cl.
　　　*G05B 19/4093*　　(2006.01)
　　　*B33Y 50/00*　　　(2015.01)

(52) U.S. Cl.
　　CPC ..... *G05B 19/40932* (2013.01); *G06F 3/1205*
　　　　　(2013.01); *G05B 2219/49023* (2013.01)

(56) References Cited

U.S. PATENT DOCUMENTS

| | | |
|---|---|---|
| 9,073,259 B2 | 7/2015 | Dufort et al. |
| 2015/0077800 A1* | 3/2015 | Yamagishi ............ G06F 3/1208 |
| | | 358/1.15 |
| 2017/0261965 A1 | 9/2017 | Shiihara |
| 2018/0200943 A1* | 7/2018 | Kikumoto .............. B33Y 50/00 |
| 2019/0182392 A1* | 6/2019 | Tokuchi ............. H04N 1/00381 |
| 2019/0212950 A1 | 7/2019 | Schloesser et al. |

FOREIGN PATENT DOCUMENTS

| | | | | |
|---|---|---|---|---|
| JP | 2017-159634 A | | 9/2017 | |
| JP | 2019012419 A | * | 1/2019 | ........... G06F 3/1282 |

OTHER PUBLICATIONS

Takahashi, Image forming system, control method of image forming system, program and storage medium, 2004, google patents, 1-34 (Year: 2004), (machine translation of JP-2004295602-A).*
Dec. 15, 2020 Office Action in Australian Patent Application No. 2020202748.

\* cited by examiner

FIG. 10

70: EVALUATION INFORMATION DB

| IMAGE TYPE | PRIORITY INFORMATION | ATTRIBUTE INFORMATION | | SCORE |
|---|---|---|---|---|
| | | CHARACTERISTIC | CHARACTERISTIC TYPE | |
| THREE-DIMENSIONAL IMAGE | QUALITY | PRINTING METHOD | INKJET METHOD | 10 |
| | | | ELECTROPHOTOGRAPHIC METHOD | 5 |
| | | PAPER TYPE | A PAPER (THICK) | 3 |
| | | | B PAPER (MEDIUM) | 5 |
| | | | C PAPER (THIN) | 8 |
| | | RESOLUTION | 300dpi | 3 |
| | | | 600dpi | 5 |
| | | | 1200dpi | 7 |
| | | COLOR STABILITY | HIGH | 8 |
| | | | MEDIUM | 5 |
| | | | LOW | 3 |
| | COST | PRINTING METHOD | INKJET METHOD | 9 |
| | | | ELECTROPHOTOGRAPHIC METHOD | 4 |
| | | PAPER TYPE | A PAPER (THICK) | 8 |
| | | | B PAPER (MEDIUM) | 5 |
| | | | C PAPER (THIN) | 3 |
| | | RESOLUTION | 300dpi | 7 |
| | | | 600dpi | 5 |
| | | | 1200dpi | 3 |
| | | COLOR STABILITY | HIGH | 8 |
| | | | MEDIUM | 5 |
| | | | LOW | 3 |
| TWO-DIMENSIONAL IMAGE | ⋮ | ⋮ | ⋮ | ⋮ |

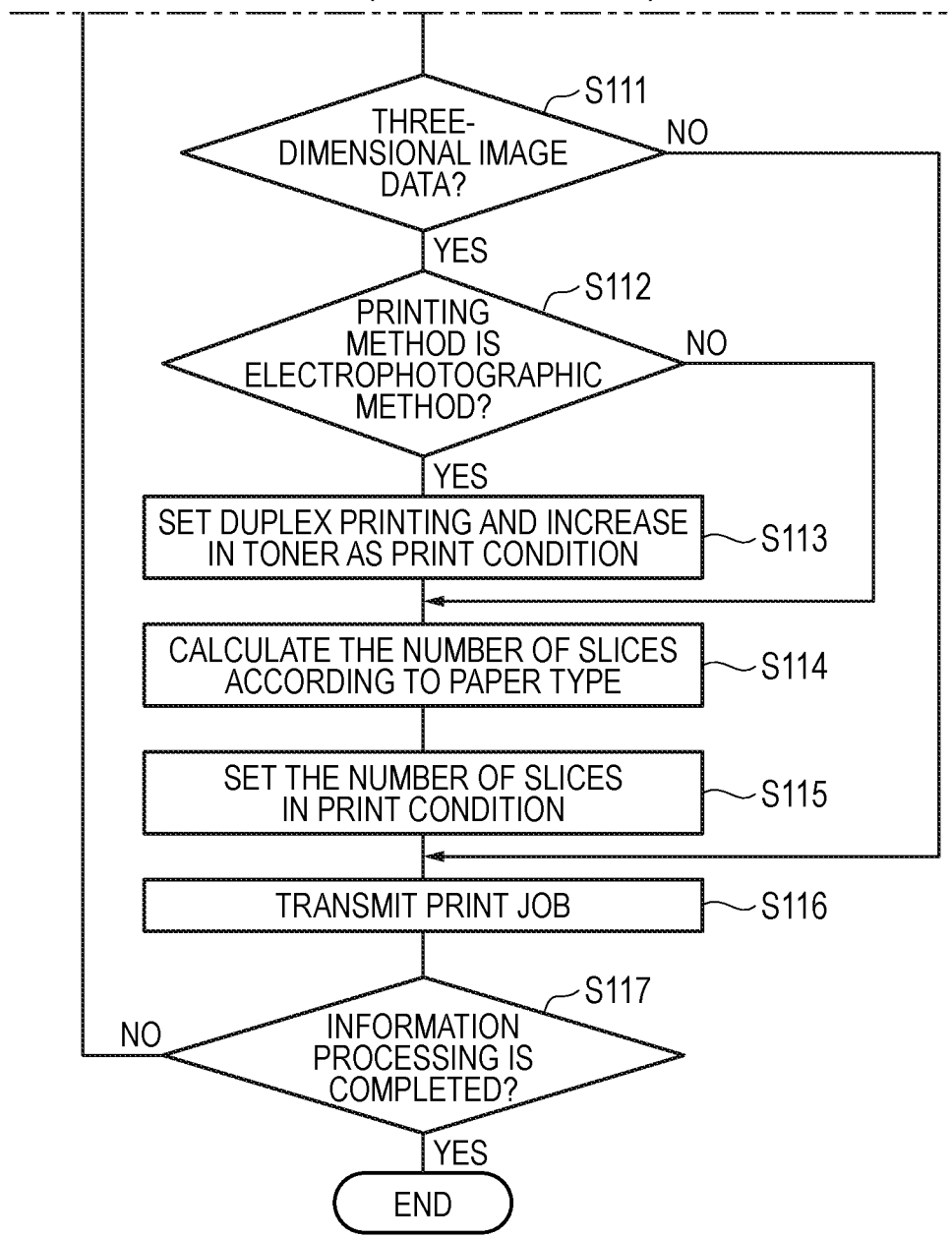

INFORMATION PROCESSING APPARATUS, COMPUTER READABLE MEDIUM STORING INFORMATION PROCESSING PROGRAM, AND THREE-DIMENSIONAL MODELING SYSTEM

CROSS-REFERENCE TO RELATED APPLICATIONS

This application is based on and claims priority under 35 USC 119 from Japanese Patent Application No. 2019-205692 filed on Nov. 13, 2019.

BACKGROUND

1. Technical Field

The present invention relates to an information processing apparatus, a computer readable medium storing an information processing program, and a three-dimensional modeling system.

2. Related Art

JP-A-2017-159634 discloses an information processing apparatus that manages information about a plurality of modeling apparatuses configured to form a three-dimensional object, the information processing apparatus including: a first acquisition unit that acquires setting information indicating setting for modeling for each modeling apparatus that has received an instruction to model an object; a second acquisition unit that acquires performance information indicating a function related to modeling capable of being provided by an alternative modeling apparatus different from the modeling apparatus that has received the instruction; a determination unit that determines whether the setting for modeling indicated by the setting information acquired by the first acquisition unit is applicable to the alternative modeling apparatus based on the performance information of the alternative modeling apparatus acquired by the second acquisition unit so as to model an object related to the instruction with the alternative modeling apparatus; and a control unit that controls display of information on whether the setting for the modeling is applicable to the alternative modeling apparatus that is determined by the determination unit, in which the control unit controls display of information on setting for the modeling that is not applicable to the alternative modeling apparatus when the determination unit determines that the setting for the modeling is not applicable to the alternative modeling apparatus.

SUMMARY

There is a technique of acquiring setting of a plurality of printing apparatuses, determining whether the printing apparatuses are applicable to printing processing in which a print instruction has been received, and selecting a printing apparatus.

However, in a printing system that forms a two-dimensional image and a three-dimensional modeled object using a recording medium, setting for forming a high-quality product is different between a case of forming a two-dimensional image on a recording medium and a case of forming a three-dimensional modeled object by stacking recording media.

Aspects of non-limiting embodiments of the present invention relate to provide an information processing apparatus and an information processing program that are capable of selecting an appropriate printing apparatus depending on a two-dimensional image and a three-dimensional modeled object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising: a processor, wherein the processor is configured to acquire, in printing processing for modeling a three-dimensional modeled object by forming respective images on recording media and stacking the recording media, a print job including at least one of two-dimensional image data for forming a two-dimensional image and three-dimensional image data for modeling a three-dimensional modeled object, an instruction of a user for the print job, and attribute information of a plurality of printing apparatuses that are candidates to perform the print job, and select a printing apparatus to perform the acquired print job from the plurality of printing apparatuses based on whether the image data contained in the print job is two-dimensional image data or three-dimensional image data, the attribute information, and the instruction of the user.

BRIEF DESCRIPTION OF DRAWINGS

Exemplary embodiments of the present invention will be described in detail based on the following figures, wherein:

FIG. 10 is a schematic diagram showing an example of an evaluation information database according to the present exemplary embodiment;

DETAILED DESCRIPTION

Figure 1A:
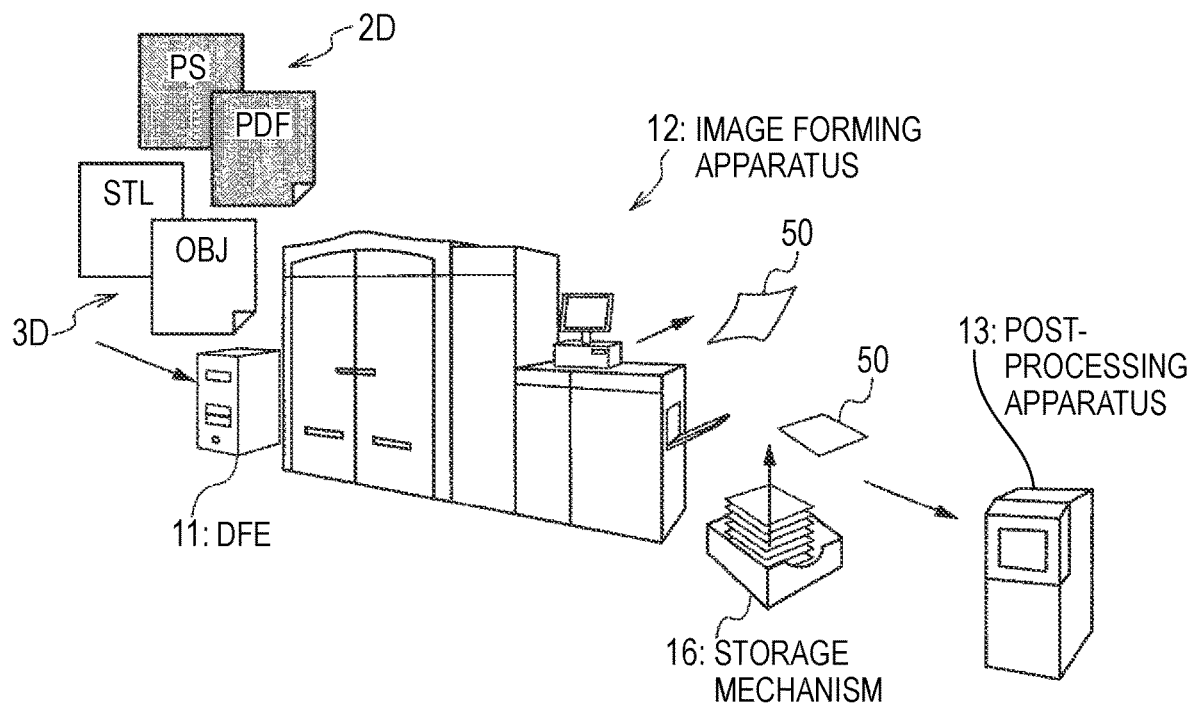
FIGS. 1A and 1B illustrate a schematic configuration example of a three-dimensional modeling system according to an exemplary embodiment.

Exemplary embodiments of the present invention will be described in detail below with reference to the drawings. Components and processing having the same function are denoted by the same reference numerals throughout the drawings, and a repetitive description thereof will be omitted.

(Three-dimensional Modeling System: Overall Configuration)

When two-dimensional image data is received, for example, when an image is formed on a recording medium based on an electrophotographic method and three-dimensional image data is received, the three-dimensional modeling system produces a three-dimensional modeled object based on a sheet stacking type three-dimensional modeling method of stacking recording media.

In the sheet stacking type three-dimensional modeling method, three-dimensional image data of a three-dimensional model is sliced on a plurality of surfaces to generate a plurality of pieces of slice data, and a series of slice images are formed on a sheet-shaped recording medium which is paper or the like based on the plurality of pieces of slice data. Then, post-processing for three-dimensional modeling of processing and stacking a plurality of recording media on which the series of slice images have been formed or the like is performed on the plurality of recording media. Here, "the series" means corresponding to "the plurality of pieces of slice data" generated from the three-dimensional image data.

Figure 1B:
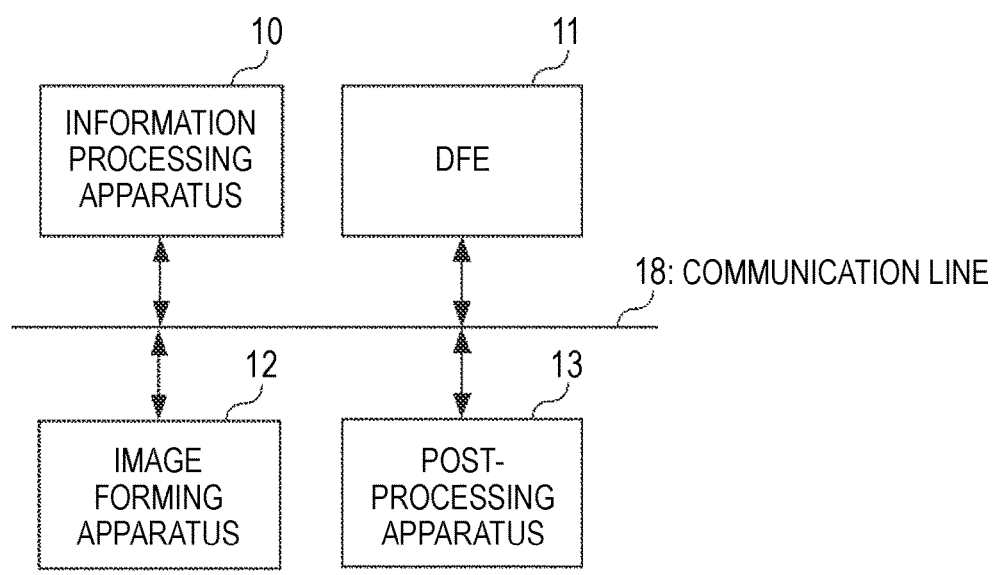
Figure 2:
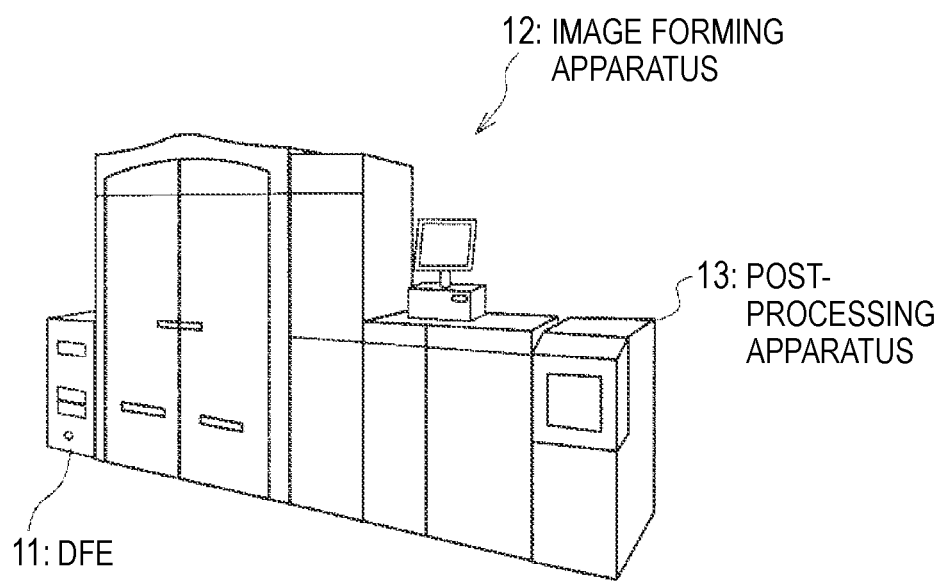
FIG. 2 illustrates another schematic configuration example of the three-dimensional modeling system according to the present exemplary embodiment.

FIGS. 1A and 1B are schematic views illustrating a configuration example of a three-dimensional modeling system according to an exemplary embodiment. FIG. 2 is a schematic view illustrating another configuration example of the three-dimensional modeling system according to the present exemplary embodiment. As illustrated in FIG. 1A, the three-dimensional modeling system according to the present exemplary embodiment includes a digital front end (DFE) 11, an image forming apparatus 12, and a three-dimensional modeling post-processing apparatus 13. As illustrated in FIG. 1B, the information processing apparatus 10, the DFE 11, the image forming apparatus 12, and the three-dimensional modeling post-processing apparatus 13 are communicably connected to one another via a communication line 18. Hereinafter, the three-dimensional modeling post-processing apparatus 13 is abbreviated as the "post-processing apparatus 13". Here, the image forming apparatus 12 is an example of a printing apparatus.

The information processing apparatus 10 allocates image data and an execution instruction of a print job that is received from a user to the three-dimensional modeling system. When having received the image data and the execution instruction of a print job from the user, the information processing apparatus 10 selects the image forming apparatus 12 according to a type of the image data and characteristics of the image forming apparatus 12, and transmits image data and a job to the DFE 11 associated with the selected image forming apparatus 12. In order to avoid complication, FIG. 1B shows only one housing of each of the DFE 11, the image forming apparatus 12, and the post-processing apparatus 13. Hereinafter, a mode will be described in which a plurality of the DFEs 11, the image forming apparatuses 12, and the post-processing apparatuses 13 are connected to the information processing apparatus 10.

The image forming apparatus 12 is configured to form an image on a recording medium 50 based on raster image data. In the present exemplary embodiment, the image forming apparatus 12 is not dedicated to three-dimensional modeling. When image formation based on the two-dimensional image data is instructed, the image forming apparatus 12 functions as a normal image forming apparatus. Therefore, the DFE 11 performs different processing depending on whether to form the image based on the two-dimensional image data or to perform three-dimensional modeling based on the three-dimensional image data.

The image forming apparatus 12 is configured to, for example, form an image on a recording medium based on the electrophotographic method. The image forming apparatus 12 using the electrophotographic method includes a photosensitive drum, a charging device, an exposure device, a developing device, a transfer device, a fixing device, and the like. The charging device is configured to charge the photosensitive drum. The exposure device is configured to expose the charged photosensitive drum with light corresponding to an image. The developing device is configured to develop an electrostatic latent image that has been formed on the photosensitive drum by performing exposure using toner. The transfer device is configured to transfer a toner image that has been formed on the photosensitive drum to a recording medium. The fixing device is configured to fix the toner image transferred to the recording medium. The image forming apparatus 12 may be an inkjet recording apparatus. In this case, the image forming apparatus 12 includes an inkjet recording head configured to eject ink droplets onto the recording medium according to an image and the like.

The DFE 11 generates a plurality of pieces of slice data from the three-dimensional image data when receiving an instruction to model a three-dimensional modeled object based on the three-dimensional image data. Next, in order to form a series of raster images, a series of pieces of raster image data is generated from the plurality of pieces of slice data. Then, the series of pieces of raster image data is output to the image forming apparatus 12. When an instruction to form a two-dimensional image based on the two-dimensional image data is received, raster image data is generated from the two-dimensional image data, and the raster image data of the two-dimensional image is output to the image forming apparatus 12.

The DFE 11 generates the slice data from the three-dimensional image data. A slice surface parallel to a ground plane (an XY plane) is set. While the slice surface is shifted at a predetermined interval along a stacking direction (a Z-axis direction), the slice data is generated each time the slice plane is shifted. In the present exemplary embodiment, the three-dimensional image data is sliced at an interval corresponding to a thickness of the recording medium in a direction intersecting the stacking direction.

The DFE 11 further generates a series of pieces of control data from the plurality of pieces of slice data when receiving the instruction to model a three-dimensional modeled object based on the three-dimensional image data. The series of pieces of control data is used for causing the post-processing apparatus 13 to perform post-processing for three-dimensional modeling. As will be described below, the control data includes control data for specifying a "cutout line" for cutting out a stacked component from the recording medium, and control data for specifying a "glued region" for applying glue to the recording medium.

The post-processing apparatus 13 is configured to perform the post-processing for three-dimensional modeling on the recording medium 50 on which a series of slice images have been formed. As illustrated in FIG. 1A, the post-processing apparatus 13 may not share a conveyance path of the recording medium 50 with the image forming apparatus 12 (offline or near-line). As illustrated in FIG. 2, the post-processing apparatus 13 may share the conveyance path of the recording medium 50 with the image forming apparatus 12 (inline).

When the conveyance path is not shared, the plurality of recording media 50 on which the series of slice images have been formed are stacked in order of formation of the slice images, and are stored in a storage mechanism 16 which is a stacker or the like. A bundle of the plurality of stacked recording media 50 is taken out from the storage mechanism 16 and is collectively delivered to the post-processing apparatus 13. On the other hand, when the conveyance path is shared, the recording media 50 on which the slice images have been formed are conveyed to the post-processing apparatus 13 one by one.

(Sheet Stacking Type Three-dimensional Modeling)

Next, each step of the sheet stacking type three-dimensional modeling will be described.

Figure 3A:
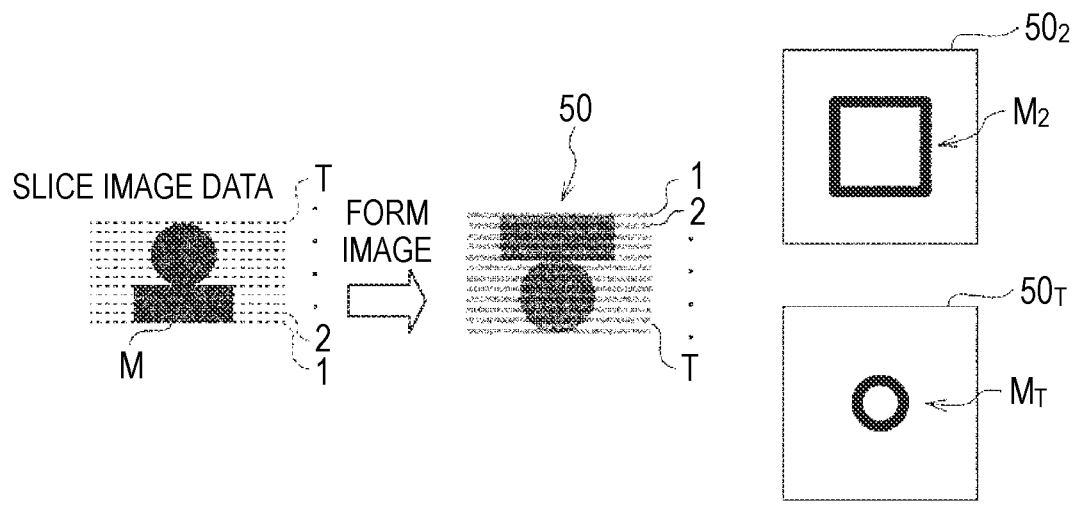
FIGS. 3A and 3B are schematic views illustrating an example of a sheet stacking type three-dimensional modeling process according to the present exemplary embodiment.
Figure 3B:
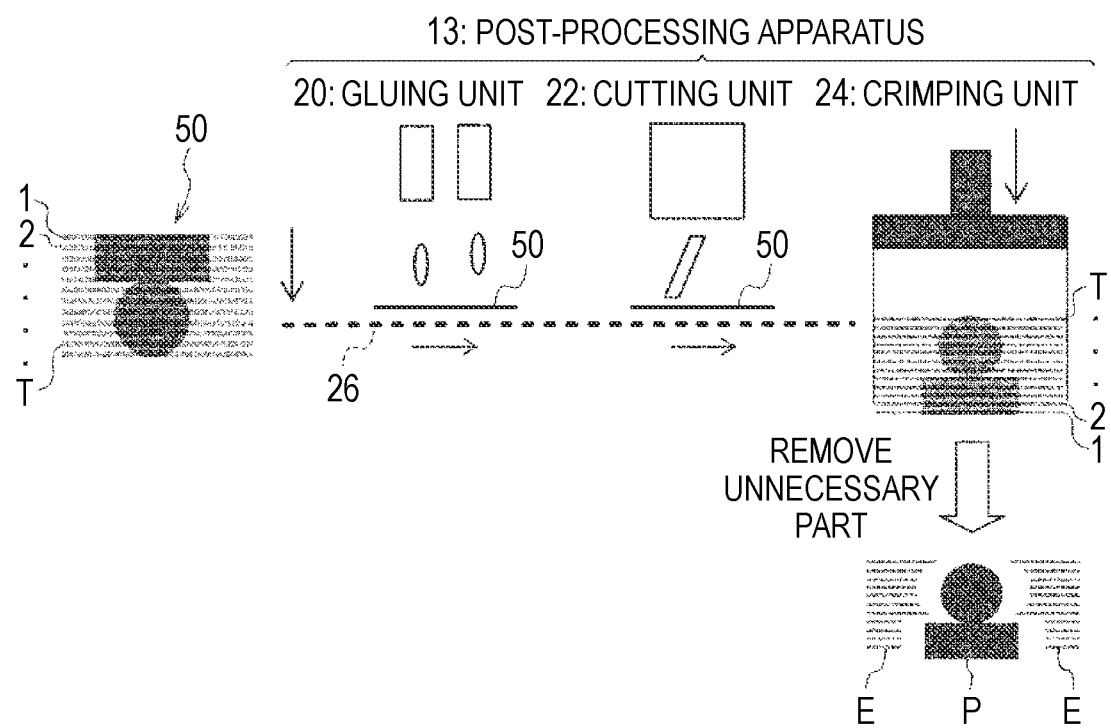

FIG. 3A is a schematic view illustrating an image forming process of the sheet stacking type three-dimensional modeling using three-dimensional image data. FIG. 3B is a schematic view illustrating a post-processing process of the sheet stacking type three-dimensional modeling.

First, as illustrated in FIG. 3A, the DFE 11 generates a plurality of pieces of slice data from three-dimensional image data of a three-dimensional model M. In an example of the present exemplary embodiment, t pieces of slice data from number 1 to number T are generated. The T pieces of slice data from number 1 to number T are converted into raster image data so as to form T slice images from number 1 to number T, respectively.

Next, as illustrated in FIG. 3A, the slice image is formed on the recording medium. The image forming apparatus 12 forms the series of slice images on the recording medium 50 based on the series of pieces of raster image data. A plurality of recording media $50_1$ to $50_T$ on which the series of slice images have been formed are stacked in the order of the formation of the slice images. When "number n" is the number from number 1 to number T, an n-th slice image is formed on an n-th recording medium $50n$.

In the illustrated example, the T slice images from number 1 to number T are formed in descending order from number T to number 1. The plurality of recording media $50_1$ to $50_T$ are stacked in descending order from number T to number 1 with the recording medium 50T on which a T-th slice image has been formed being the lowest layer. The plurality of recording media $50_1$ to $50_T$ are stacked in descending order, so that the plurality of recording media $50_1$ to $50_T$ are supplied in ascending order from number 1 to number T in the subsequent post-processing process. That is, the T slice images are formed on the recording medium 50 in an order "reverse" to the order of the post-processing performed by the post-processing apparatus 13.

Next, as illustrated in FIG. 3B, the post-processing is performed on the recording medium 50 on which the slice image has been formed. The post-processing apparatus 13 includes a gluing unit 20 configured to perform gluing processing, a cutting unit 22 configured to perform cutting processing, and a crimping unit 24 configured to perform crimping processing. The gluing unit 20, the cutting unit 22, and the crimping unit 24 are provided in the order described along the conveyance path 26 configured to convey the recording medium 50. The post-processing apparatus 13 acquires the series of pieces of control data corresponding to the series of slice images from the DFE 11.

Here, the slice image will be described.

Figure 4A:
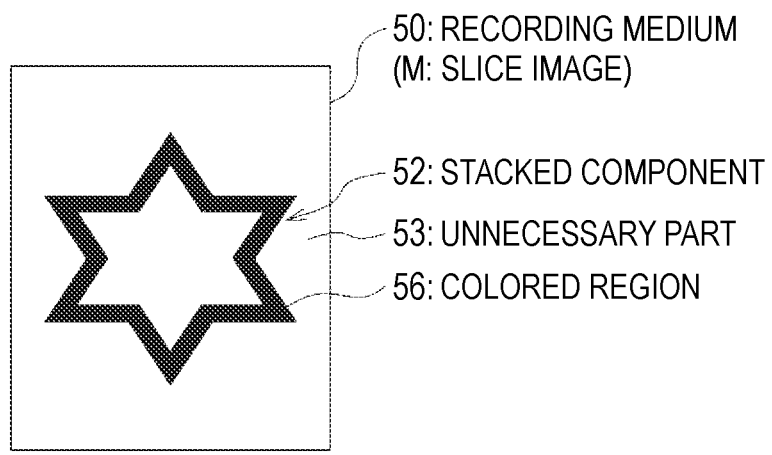
FIGS. 4A, 4B and 4C are schematic views illustrating an example of a slice image according to the present exemplary embodiment.
Figure 4B:
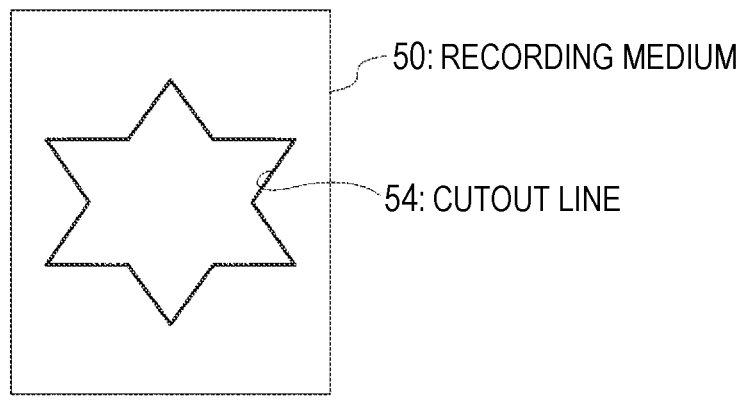
Figure 4C:
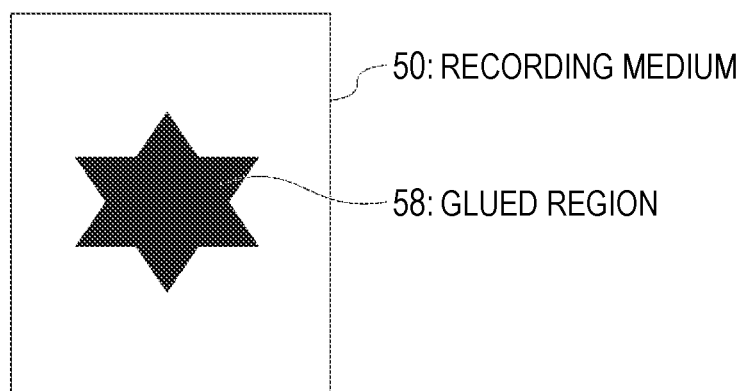

FIGS. 4A to 4C are schematic views illustrating an example of a state in which the slice image is formed on the recording medium. As illustrated in FIG. 4A, the slice image on the recording medium 50 includes a stacked component 52 that is stacked to form a three-dimensional modeled object and an unnecessary part 53. A colored region 56 having a set width is formed at a periphery of the stacked component 52. As illustrated in FIG. 4B, an outer peripheral line of the stacked component 52 is a cutout line 54 for cutting out the stacked component 52 from the recording medium 50.

As illustrated in FIG. 4C, for example, a glued region 58 is set inside the outer peripheral line (the cutout line 54) of the stacked component 52, for example, in a region inside the colored region 56. An entire surface of the recording medium 50 including the unnecessary part 53 may be glued. However, by setting the glued region 58 inside the outer peripheral line of the stacked component 52, operation of removing a removal target E (see FIG. 3B) is easier than that in a case of gluing the entire surface. The glued region 58 is set inside the outer peripheral line of the stacked component 52, so that glue does not protrude from the stacked component 52 during the crimping processing after the gluing.

Setting of a width of the colored region 56 and setting of a retreat width of the glued region 58 from the outer peripheral line of the stacked component 52 may be performed when a user instructs the three-dimensional modeling, for example, when a setting screen is displayed on a display unit 34 of the DFE 11 and the setting from the user is received by the operation unit 32. Predetermined initial setting may be used.

The control data includes control data for specifying the cutout line 54 and control data for specifying the glued region 58. For example, coordinate data of a point on a path of the cutout line 54 is the control data for specifying the cutout line 54. Coordinate data of each point in the glued region 58 is the control data for specifying the glued region 58.

The recording media 50 are supplied to the gluing unit 20 one by one from the bundle of the plurality of recording media 50. The gluing unit 20 is configured to apply glue to the glued region 58 of the recording medium 50 based on the control data for specifying the glued region 58. The gluing unit 20 may include, for example, a glue ejection head configured to eject glue. The glue ejection head moves in the stacking direction (a w direction) and an in-plane direction (a u direction and a v direction) of the recording medium 50. The glue ejection head scans the glued region 58 while ejecting glue, so that the glue is applied to the glued region 58 of the recording medium 50. The recording medium 50 on which the gluing processing has been completed is supplied to the cutting unit 22.

The cutting unit 22 is configured to cut the recording medium 50 along the cutout line 54 based on the control data for specifying the cutout line 54. The cutting unit 22 may be, for example, a cutter including a cutting edge. The cutting edge of the cutter moves in the stacking direction (the w direction) and the in-plane direction (the u direction and the v direction) of the recording medium 50. The cutting edge of the cutter is moved in the in-plane direction while being pressed against the recording medium 50, so that the recording medium 50 is cut.

A depth of the cutting is determined by adjusting a position of the cutting edge of the cutter in the stacking direction. The depth of the cutting may be a depth that does not reach a back surface. The stacked component is not separated from the recording medium 50, so that a lack of the stacked component 52 in a conveyance process is avoided.

The cutter needs only to have a function of cutting the recording medium 50 along the cutout line 54, and is not limited to a mechanical cutter that presses the cutting edge. For example, an ultrasonic cutter that radiates an ultrasonic wave to perform cutting or a laser cutter that radiates laser light to perform cutting may be used.

The cutting unit 22 may form a plurality of perforations in the recording medium 50 along the cutout line 54 instead of performing cutting. When the plurality of perforations are formed, the stacked component is connected to the recording medium 50, so that the lack of the laminated component 52 in the conveyance process is further avoided.

The recording medium 50 on which the cutting processing has been completed is supplied to the crimping unit 24. The crimping unit 24 sequentially stacks the supplied recording medium 50. At this time, the plurality of recording media $50_1$ to $50_T$ are stacked in ascending order from number 1 to number T. The crimping unit 24 is configured to crimp the plurality of recording media 50 by applying pressure to the bundle of the plurality of stacked recording media 50 along the stacking direction. Each of the plurality of glued recording media $50_1$ to $50_T$ is adhered to upper and lower recording media 50 in the glued region 58 by being crimped.

The recording medium 50 on which the cutting processing has been completed includes the stacked component 52 that is stacked to form a three-dimensional modeled object P and the unnecessary part 53, but is stacked integrally without removing the unnecessary part 53. The unnecessary part 53 of the recording medium 50 is a support member configured to support the three-dimensional modeled object P obtained by stacking the stacked component 52. After the crimping processing performed by the crimping unit 24 has been completed, the removal target E formed by stacking the stacked component 52 of the recording medium 50 is removed to separate the three-dimensional modeled object P.

Next, an example of the "control data" will be described.

Figure 5B:
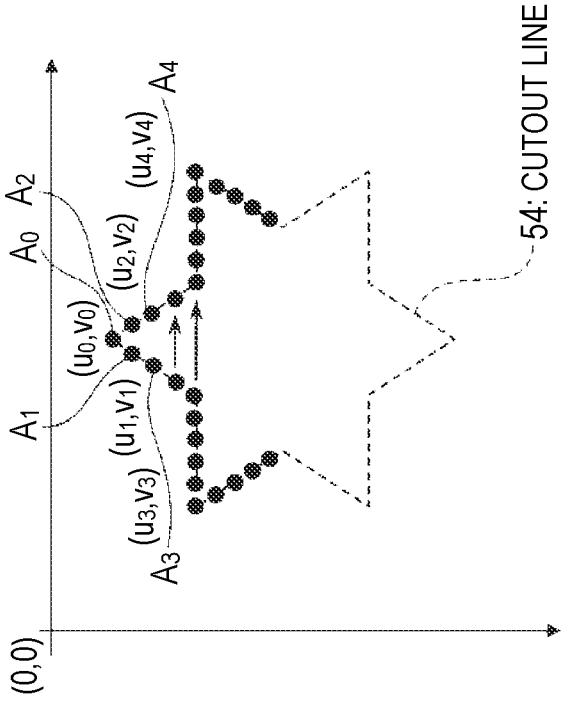
FIGS. 5A and 5B are schematic views illustrating an example of control data for specifying a cutout line according to the present exemplary embodiment.
Figure 5A:
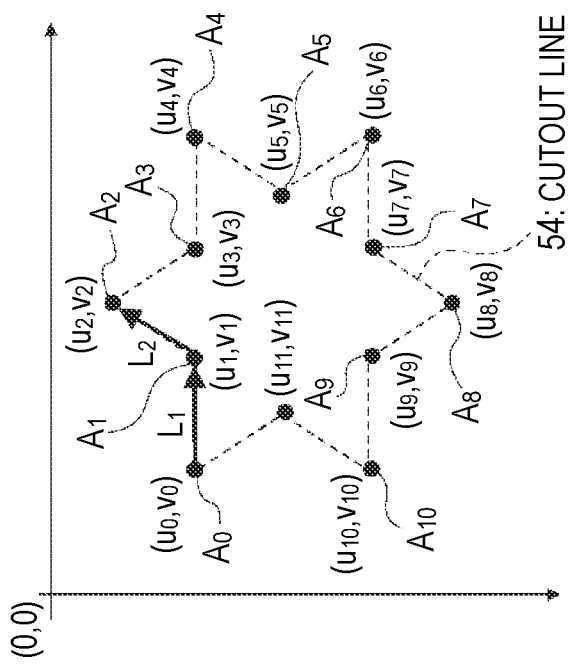
Figure 6B:
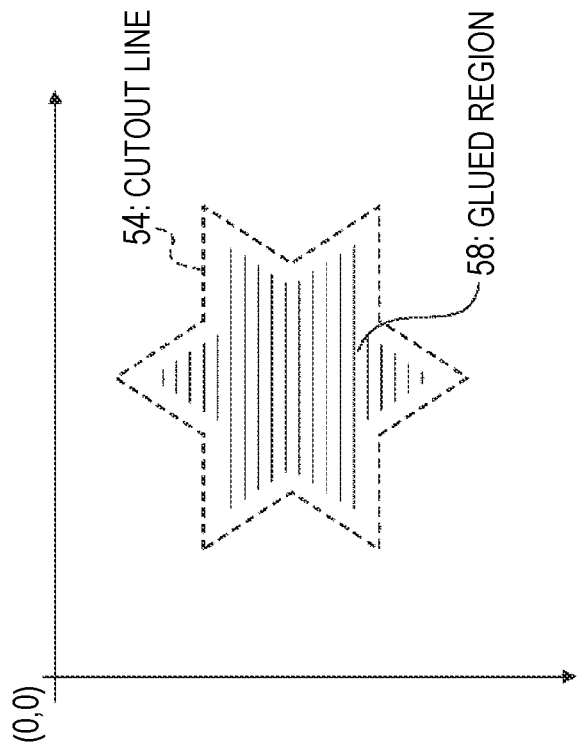
FIGS. 6A and 6B are schematic views illustrating an example of control data for specifying a glued region according to the present exemplary embodiment.
Figure 6A:
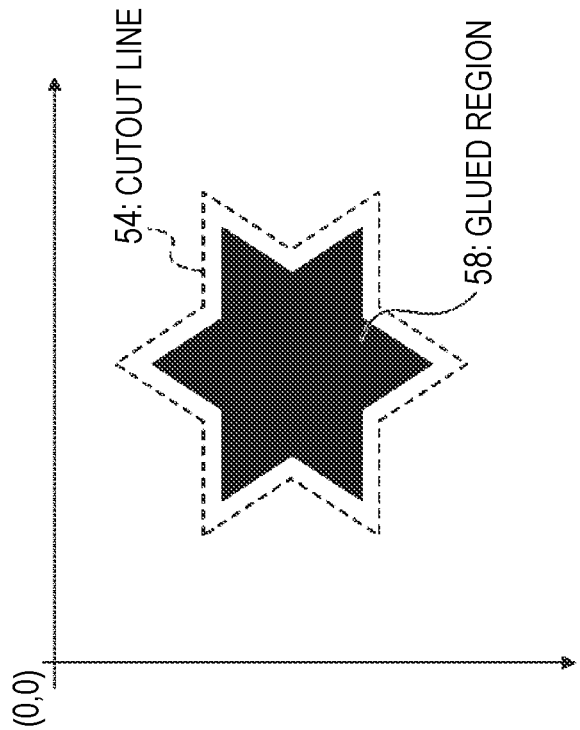

FIGS. 5A and 5B are schematic views illustrating an example of the control data for specifying the cutout line. FIGS. 6A and 6B are schematic views illustrating an example of the control data for specifying the glued region. As will be described below, stacking data includes coordinate data of a vertex of an intersection region where a polygon and a slice surface intersect. The intersection region is present along the outer peripheral line of the stacked component 52. Therefore, as illustrated in FIG. 5A, the coordinate data of the points on the path of the cutout line 54, which is coordinates $(u_0, v_0)$ of a point $A_0$ and the like, is the control data for specifying the cutout line 54.

In the illustrated example, the star-shaped stacked component 52 has eleven vertices $A_0$ to $A_{10}$. For example, when the point $A_0$ is set as a start point, the cutout line 54 is specified by tracing the points in order of $A_0 \to A_1 \to A_2 \to A_3 \to A_4 \to A_5 \to A_6 \to A_7 \to A_8 \to A_9 \to A_{10}$.

As illustrated in FIG. 5B, when the plurality of perforations are formed, coordinate data of perforation points on the path of the cutout line 54 is the control data for specifying the cutout line 54. For example, when the point $A_0$ is set as a start point, the cutout line 54 is specified by tracing the points in order of formation of the perforations which is $A_0 \to A_1 \to A_2 \to A_3 \to A_4 \ldots$ and the like.

As illustrated in FIG. 6A, coordinate data of points in the glued region 58 is the control data for specifying the glued region 58. The glued region 58 is slightly smaller than the stacked component 52, and is set inside the outer peripheral line of the stacked component 52. The glued region 58 may be specified by reducing an image of the stacked component 52. In this case, the glued region 58 is provided such that a center of gravity of the image of the stacked component 52 matches a center of gravity of the glued region 58. The coordinate data of the points in the glued region 58 is obtained from the retreat width of the glued region 58 from the outer peripheral line of the stacked component 52 and the coordinate data of the points on the path of the cutout line 54.

As illustrated in FIG. 6B, it is not necessary to glue entirety of the glued region 58. The glued region 58 may be partially thinned out, and a part of the glued region 58 may be glued. A concentration of the glue does not need to be constant throughout the entirety of the glued region 58. When the concentration of the glue may be changed, a concentration of the glue in a periphery of the glued region 58 may be higher than a concentration of the glue at a center of the glued region 58.

An origin of the control data for specifying the cutout line 54 and an origin of the control data for specifying the glued region 58 are aligned with an origin of an image forming position when the slice image is formed. When the post-processing apparatus 13 has an image reading function, the image forming apparatus 12 may form a mark image indicating a position of the "origin of the control data" together with the slice image on the recording medium 50, and the post-processing device 13 may read the mark image and acquire position information of the "origin of the control data".

A format of the control data is not limited to the coordinate data. For example, the control data may be image data such as binary raster image data that expresses the cutout line 54 or the glued region 58 as a graphic or an image. When the control data is the binary raster image data, in the example illustrated in FIG. 4B, a pixel value of the cutout line 54 is set as "1", and a pixel value of the other regions is set as "0". In the example illustrated in FIG. 4C, a pixel value of the glued region 58 is set as "1", and a pixel value of the other regions is set as "0". For example, the glue ejection head of the gluing unit 20 ejects glue onto the recording medium 50 when the pixel value is "1". The glue ejection head does not eject glue onto the recording medium 50 when the pixel value is "0".

Figure 7:
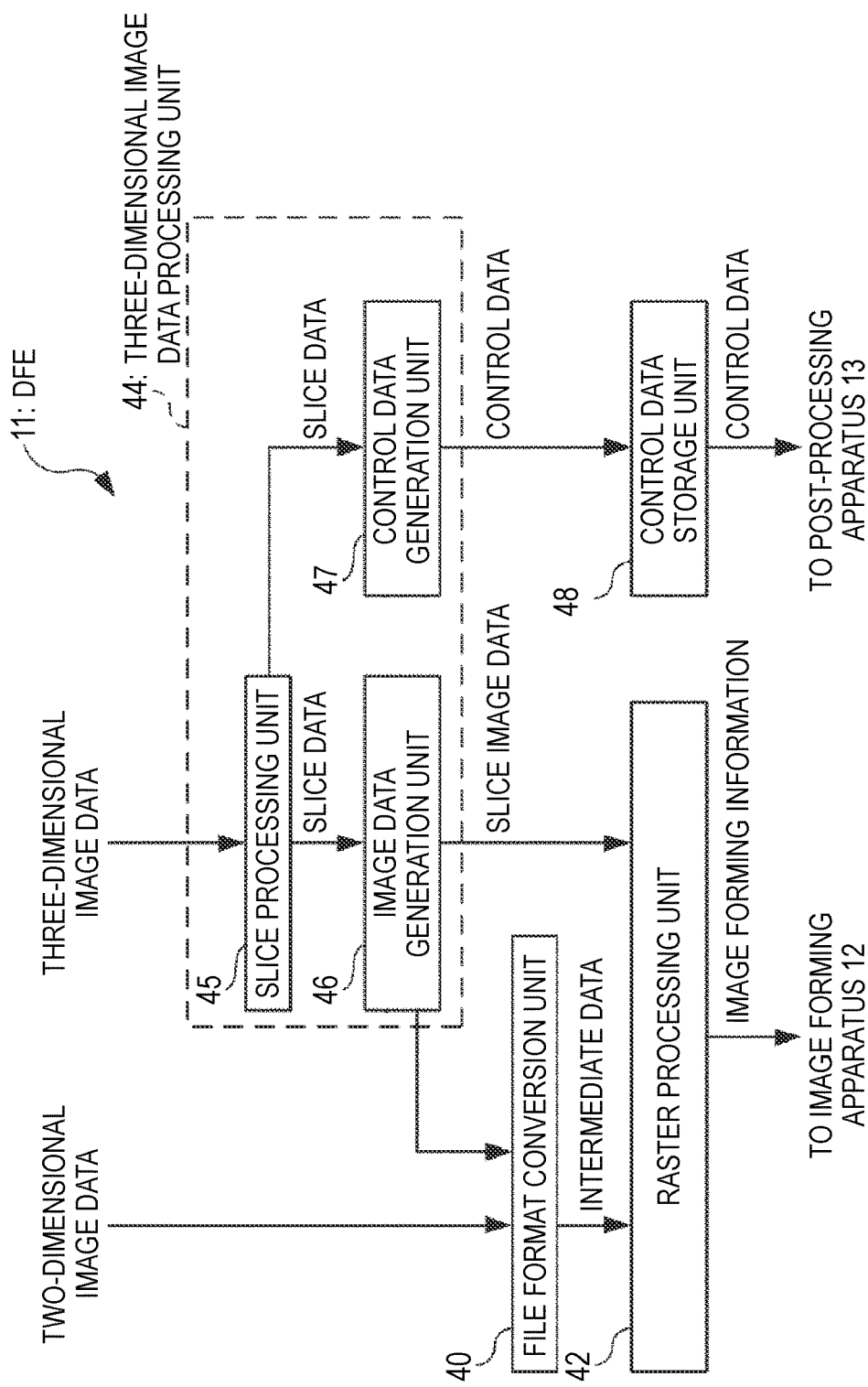
FIG. 7 is a functional block diagram showing a functional configuration example of a DFE according to the present exemplary embodiment.

FIG. 7 is a functional block diagram showing a functional configuration example of the DFE 11 according to the present exemplary embodiment. As shown in FIG. 7, the DFE 11 includes a file format conversion unit 40, a raster processing unit 42, a three-dimensional data processing unit 44, and a control data storage unit 48. The file format conversion unit 40 is configured to convert acquired data (hereinafter referred to as "PDL data") described in a page description language into intermediate data when the PDL data has been acquired.

The raster processing unit 42 is configured to perform raster processing on the intermediate data obtained by the file format conversion unit 40 to generate the raster image data. The raster processing unit 42 is configured to perform raster processing on slice image data obtained by an image data generation unit 46 (described below) to generate the raster image data.

The three-dimensional data processing unit 44 is configured to process the acquired three-dimensional image data to generate the slice image data and the control data. Specifically, the three-dimensional data processing unit 44 includes a slice processing unit 45, an image data generation unit 46, and a control data generation unit 47.

The slice processing unit 45 generates the slice data from the acquired three-dimensional image data. The image data generation unit 46 is configured to generate the slice image data from the slice data obtained by the slice processing unit 45. The control data generation unit 47 is configured to generate control data from the slice data obtained by the slice processing unit 45. The control data storage unit 48 is configured to store the control data obtained by the control data generation unit 47.

(Two-dimensional Data Processing)

The "two-dimensional data processing" for the two-dimensional image will be described.

When the image formation based on the two-dimensional image data has been instructed, the two-dimensional image data is acquired as PDL data. The PDL data is converted into the intermediate data by the file format conversion unit 40 and is output to the raster processing unit 42. The raster processing unit 42 performs raster processing on the intermediate data to generate the raster image data of the two-dimensional image. The raster image data is output to the image forming apparatus 12.

Here, the "intermediate data" is section data obtained by segmenting each object (for example, a character font, a graphics figure, or image data), which is an image element of an image of a page, for each scan line of raster scan. The section data represents a section occupied by an object on one scanning line. The section data is represented by, for example, a set of coordinates at two ends of the section. The section data includes information that defines a pixel value of each pixel in the section. The PDL data is converted to the intermediate data and is transferred, so that a data transfer speed in the DFE 11 is improved.

(Three-dimensional Image Data Processing)

The "three-dimensional image data processing" for the three-dimensional image data will be described.

When the three-dimensional modeling based on the three-dimensional image data has been instructed, the three-dimensional image data of the three-dimensional model is acquired. The slice processing unit 45 generates the slice data from the three-dimensional image data. The generated slice data is output to each of the image data generation unit 46 and the control data generation unit 47. Here, the "three-dimensional image data" and the "slice data" will be described in detail.

As the three-dimensional image data of the three-dimensional model M, for example, OBJ format three-dimensional image data (hereinafter referred to as "OBJ data") is used. In the OBJ data, the three-dimensional model M is represented as a set of triangular polygons. The three-dimensional image data may be in another format which is an STL format or the like. The STL format does not include color information, so that color information is added when the STL format is used.

Hereinafter, a case will be described in which the three-dimensional image data is the OBJ data. The OBJ data includes an OBJ file that handles shape data and an MTL file that handles color information. In the OBJ file, a polygon unique surface number, the coordinate data of each vertex of the triangular polygon, and the like are associated with each polygon. In the MTL file, color information is associated with each polygon.

The slice processing unit 45 sets a direction of the slice surface obtained by slicing the three-dimensional model M along a direction intersecting the stacking direction. Then, the slice processing unit 45 sequentially slices the three-dimensional model M from one end at a predetermined stacking pitch (a distance) k in a direction orthogonal to the slice surface along the set direction of the slice surface, and generates the slice data each time the three-dimensional model M is sliced.

At this time, the number of the slice surface at one end at which the slice is started is set as "1", and the number of the obtained slice surface is increased by "1" each time the three-dimensional model M is sliced. In the example illustrated in FIG. 3A, there are T slice surfaces from number 1 to number T. The slice data represents a cross-sectional image obtained by slicing the three-dimensional model M to the slice surface. Specifically, the slice data represents the cross-sectional image of the three-dimensional model M by the number of the slice surface, the coordinate data of the vertex of the intersection region where the polygon and the slice surface intersect, and the color information set for the polygon that intersects the slice surface. T pieces of slice data from number 1 to number T are generated according to the T slice surfaces. The stacking pitch k is an example of the predetermined interval.

The image data generation unit 46 is configured to generate the slice image data from the slice data obtained by the slice processing unit 45. The slice data is converted into the slice image data in a file format which is JPEG or the like. When the slice image data is generated, a colored region may be added to the slice image. The generated slice image data is output to the raster processing unit 42. The raster processing unit 42 is configured to perform the raster processing on the slice image data obtained by the image data generation unit 46 to generate the raster image data. The generated raster image data of the slice image is output to the image forming apparatus 12.

The image data generation unit 46 may generate the intermediate data. In this case, the image data generation unit 46 generates the PDL data from the slice data obtained by the slice processing unit 45, and outputs the PDL data to the file format conversion unit 40. The PDL data is converted into the intermediate data by the file format conversion unit 40 and is output to the raster processing unit 42. The raster processing unit 42 performs raster processing on the intermediate data to generate the raster image data of the slice image. The raster image data is output to the image forming apparatus 12.

The control data generation unit 47 is configured to generate the control data from the slice data obtained by the slice processing unit 45. The generated control data is associated with the number (which is the same as the number of the slice surface) of the slice image, and is stored in the control data storage unit 48. When an instruction to start the post-processing is received from the user, the control data is read from the control data storage unit 48 and is output to the post-processing apparatus 13.

The DFE 11 includes the control data storage unit 48 in the functional block diagram of the DFE 11 shown in FIG. 7. However, a storage unit configured to store the control data may be provided outside the DFE 11. For example, the storage unit may be provided in the post-processing apparatus 13. In this case, the control data generated by the DFE 11 is stored in the storage unit of the post-processing apparatus 13, and is read from the storage unit of the post-processing apparatus 13 and used.

As described above, the image data and the instruction of the modeling processing are transmitted to the DFE 11, so that the image forming apparatus 12 and the post-processing apparatus 13 create the three-dimensional model M and model the three-dimensional modeled object.

(Information Processing Apparatus)

Next, the information processing apparatus 10 will be described.

Figure 8:
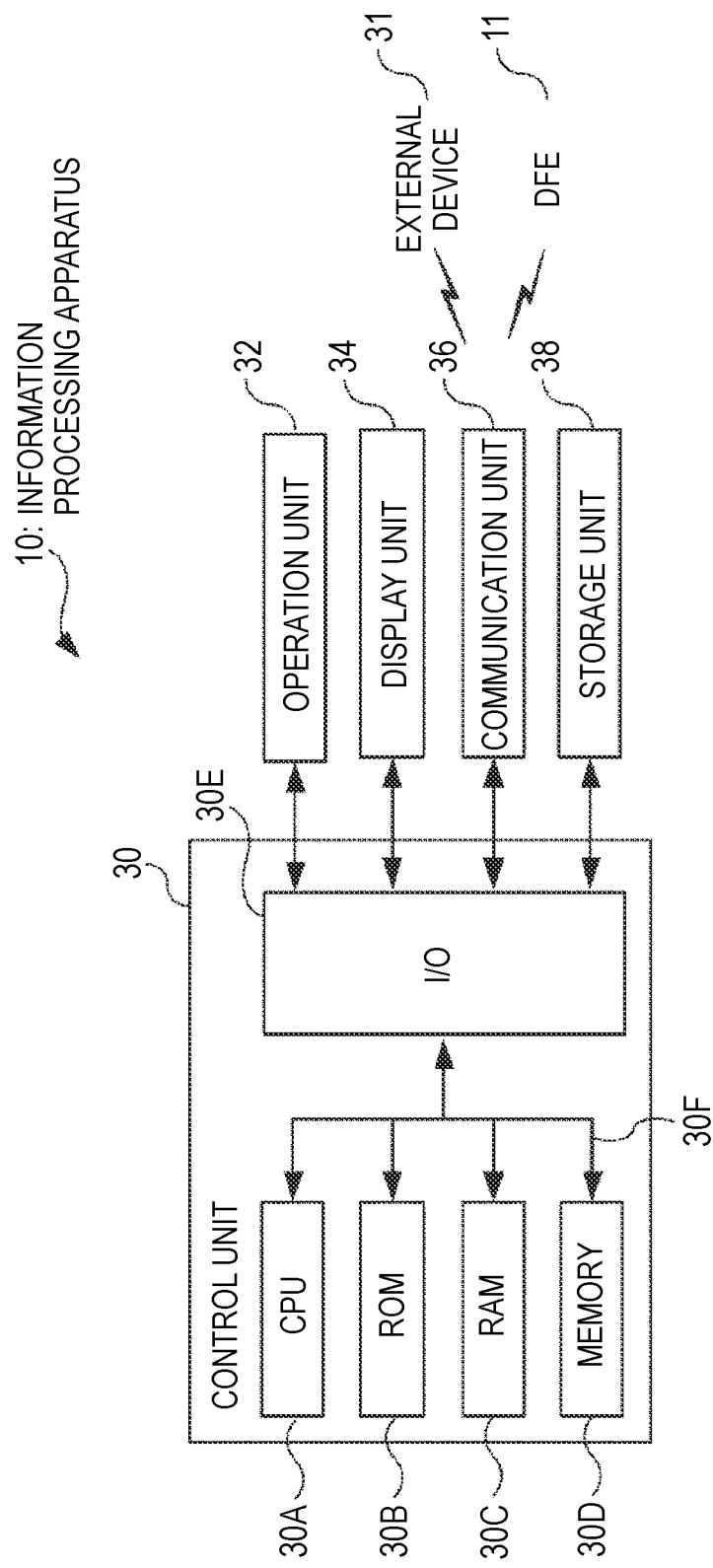
FIG. 8 is a block diagram showing a configuration example of a main part of an electric system of an information processing apparatus according to the present exemplary embodiment.

FIG. 8 is a block diagram showing an electrical configuration of the information processing apparatus 10 according to the exemplary embodiment of the present invention. As shown in FIG. 8, the information processing apparatus 10 includes an information processing unit 30, an operation unit 32 configured to receive operation performed by a user, a display unit 34 configured to display information to a user, a communication unit 36 configured to communicate with an external device 31, and a storage unit 38 which is an external storage device or the like. The operation unit 32, the display unit 34, the communication unit 36, and the storage unit 38 are connected to an input and output interface (I/O) 30E of the information processing unit 30.

The information processing unit 30 includes a central processing unit (CPU) 30A, a read only memory (ROM) 30B, a random access memory (RAM) 30C, a nonvolatile memory 30D, and the I/O 30E. The CPU 30A, the ROM 30B, the RAM 30C, the nonvolatile memory 30D, and the I/O 30E are connected to one another via a bus 30F. The CPU 30A is configured to read a program from the ROM 30B, and to execute the program using the RAM 30C as a work area.

The operation unit 32 is configured to receive operation using a mouse, a keyboard, or the like from a user. The display unit 34 is configured to display various screens to the user on a display or the like. The communication unit 36 is configured to communicate with the external device 31 via a wired or wireless communication line. The communication unit 36 functions as an interface configured to communicate with the external device 31 which is a computer or the like connected to a communication line such as a local area network (LAN), a dedicated line, or the Internet. The storage unit 38 includes a storage device which is a hard disk or the like.

Figure 9:
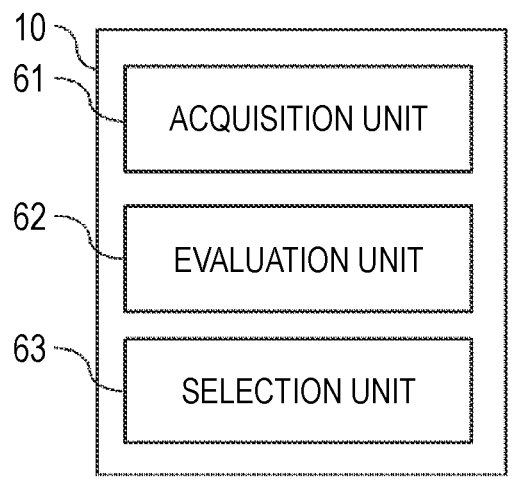
FIG. 9 is a functional block diagram showing a functional configuration example of the information processing apparatus according to the present exemplary embodiment.

FIG. 9 is a functional block diagram showing a functional configuration of the information processing apparatus 10 according to the present exemplary embodiment. As shown in FIG. 9, the information processing apparatus 10 includes an acquisition unit 61, an evaluation unit 62, and a selection unit 63.

The acquisition unit 61 is configured to acquire the print job including the image data, a user instruction in the print job, characteristics of each of the image forming apparatuses 12 connected to the information processing apparatus 10 via the communication line, and a print schedule of each of the image forming apparatuses 12. Here, the characteristics are a printing method, a paper type, resolution, and color stability that are set in each of the image forming apparatuses 12. The print schedule is information in which the print job allocated to the image forming apparatus 12 and a date and time at which the print job is performed are associated with each other. The user instruction is information (hereinafter, referred to as "priority information") that indicates whether to give priority to quality or cost in the print job. The print job includes at least one of the two-dimensional image data and the three-dimensional image data, and a type of the image data indicates the two-dimensional image data or the three-dimensional image data. Hereinafter, the type of the image data is referred to as an "image type". The print schedule is an example of information on the print job to be performed by the printing apparatus.

The evaluation unit 62 selects the image forming apparatus 12 to perform the print job from the image forming apparatuses 12 related to the print job using the user instruction and the characteristics of each image forming apparatus 12. Specifically, the information processing apparatus 10 has information (hereinafter, referred to as "evaluation information") in which a predetermined value (hereinafter, referred to as a "score") is set for each type of the image data, each piece of the priority information, and each characteristic. The evaluation unit 62 is configured to calculate, based on the evaluation information, the evaluation value for each image forming apparatus 12 by adding the scores corresponding to the type of the image data, the priority information related to each image forming apparatus 12, and the characteristic. That is, the evaluation value is a sum of the scores of the type of the image data, the priority information of each image forming apparatus 12, and the characteristics. The evaluation information will be described below with reference to FIG. 10.

The selection unit 63 is configured to select the image forming apparatus 12 using the evaluation value calculated using the print job and the print schedule. Specifically, the selection unit 63 selects the image forming apparatus 12 having the highest evaluation value as a candidate, and determines whether it is possible to allocate the print job with reference to the print schedule of the image forming apparatus 12. When the print job cannot be set in the print schedule, the selection unit 63 selects the image forming apparatus 12 having a second highest evaluation value as a candidate, and selects the image forming apparatus 12 that can set the print job in the print schedule.

Next, a method for selecting the image forming apparatus 12 performed by the information processing apparatus 10 will be described with reference to FIGS. 10 to 12 before describing operation of the information processing apparatus 10. First, the evaluation information will be described with reference to FIG. 10. An evaluation information database (hereinafter, referred to as an "evaluation information DB") 70 according to the present exemplary embodiment will be described. FIG. 10 is a schematic diagram showing an example of the evaluation information database 70 according to the present exemplary embodiment. The evaluation information DB 70 is stored in the storage unit 38 of the information processing apparatus 10.

As an example, as shown in FIG. 10, the evaluation information DB 70 has the image type, the priority information, the characteristics, the type, and the score. The image type is the type of the image data (the two-dimensional image data and the three-dimensional image data) contained in the print job, and the priority information is given by the user and indicates whether to give priority to the quality or the cost. The characteristics include the printing method, the paper type, the resolution, the color stability, and the like of the image forming apparatus 12. A characteristic type is a type of the characteristic (for example, a type of the printing method which is an inkjet recording method, an electrophotographic method, and the like in a case of the printing method). The score is a predetermined value for each image type, each piece of the priority information, each characteristic, and each characteristic type. As shown in FIG. 10, the score contained in the evaluation information DB 70 is set according to the image type, the priority information, the characteristic, and the characteristic type. Here, the characteristic and the characteristic type are examples of attribute information.

When a case of forming a high-quality two-dimensional image using the image forming apparatus 12 is compared with a case of modeling a high-quality three-dimensional modeled object using the image forming apparatus 12, the characteristic types for attaining high quality are different. For example, in terms of the printing method for modeling the three-dimensional modeled object, the three-dimensional modeled object modeled using the inkjet recording method has higher quality than that of the three-dimensional modeled object modeled using the electrophotographic method. Ink easily permeates into paper as compared with toner, and the ink permeates into the paper to improve the color development of the three-dimensional modeled object, so that the higher quality three-dimensional modeled object is modeled using the inkjet recording method. On the other hand, in terms of the printing method for forming the two-dimensional image, the higher quality two-dimensional image is formed using the electrophotographic method. The toner has a property of hardly permeating as compared with the ink, so that the higher quality two-dimensional image is formed using the toner. In terms of a paper type for modeling the three-dimensional modeled object, the high-quality three-dimensional modeled object is modeled using thin paper since the resolution in the stacking direction is increased.

As described above, the characteristic types for attaining high quality differ depending on the type of the image data, so that the scores contained in the evaluation information DB 70 are set in consideration of the image type, the priority information, the characteristics, and the characteristic types. For example, as shown in FIG. 10, when the image type is the "three-dimensional image" and the priority information is the "quality", the higher quality three-dimensional image is formed using the ink when the scores of the "printing method" of the characteristics are compared, so that the score of the "inkjet recording method" is set to be higher than that of the "electrophotographic method". When the scores of the "paper type" of the characteristics are compared, the resolution in the stacking direction increases as the paper becomes thinner, so that higher scores are set in order of a "C paper (thin)", a "B paper (medium)", and an "A paper (thick)".

Similarly, the score is also set for each piece of the priority information. When the three-dimensional modeled object is modeled using the image forming apparatus 12, appropriate characteristic types are different depending on whether priority is given to the cost or the quality. For example, when the three-dimensional modeled object is modeled using the toner, the toner has a property of hardly permeating into the paper, so that a large amount of the toner may be used, and the cost may not be reduced. In terms of the paper type, when thick paper is used, it may be possible to reduce the number of pieces of the paper and to reduce the cost.

Therefore, in the evaluation information DB 70 according to the present exemplary embodiment, when the image type is the "three-dimensional image" and the priority information is the "cost", the cost can be reduced using the ink. Therefore, the score of the "inkjet recording method" is set to be higher than that of the "electrophotographic method" when the scores of the "printing method" of the characteristics are compared. The number of pieces of the paper is reduced as the paper becomes thicker, so that higher scores are set in order of the "A paper (thick)", the "B paper (medium)", and the "C paper (thin)" when the scores of the "paper type" of the characteristics are compared.

In the evaluation information DB 70 according to the present exemplary embodiment, a mode has been described in which the scores are set for each image type, each piece of the priority information, each characteristic, and each characteristic type. However, the present invention is not limited thereto. For example, the score is set for each characteristic and each characteristic type, and any value may be added to and subtracted from each score according to the acquired image type and priority information.

Next, processing of selecting the image forming apparatus 12 will be described with reference to FIGS. 11 and 12. FIG. 11 is a schematic view illustrating an example of the processing of selecting the image forming apparatus 12 according to the present exemplary embodiment. FIG. 12 is a schematic view illustrating an example of the processing of selecting an image forming apparatus 12 that illustrates a case of selecting an image forming apparatus having a second highest evaluation value according to the present exemplary embodiment.

Figure 11:
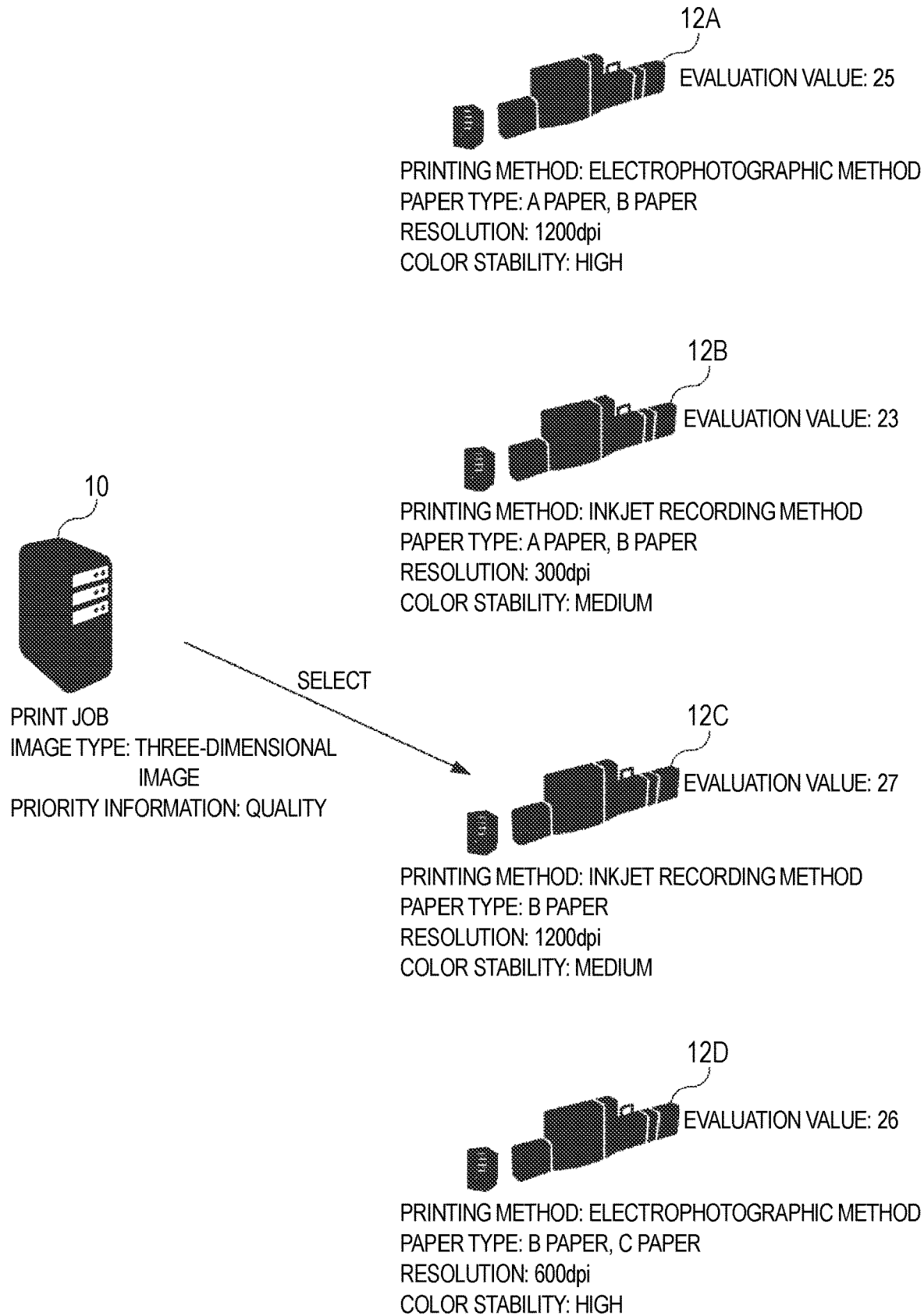
FIG. 11 is a schematic view illustrating an example of processing of selecting an image forming apparatus according to the present exemplary embodiment.

As illustrated in FIG. 11, the image forming apparatus 12 has the characteristics set for each image forming apparatus 12. The information processing apparatus 10 acquires the characteristics from each image forming apparatus 12, and calculates the evaluation value of each image forming apparatus 12 using the evaluation information. Here, as the paper type illustrated in FIG. 11, one image forming apparatus 12 may have a plurality of the characteristic types. In the present exemplary embodiment, when one image forming apparatus 12 has a plurality of the characteristic types, a mode will be described in which the evaluation value is calculated by selecting the characteristic type having the largest value. That is, when one image forming apparatus 12 has a plurality of the characteristic types, the information processing apparatus 10 selects the characteristic type having the highest score, and calculates the evaluation value. However, the present invention is not limited thereto. When one image forming apparatus 12 has a plurality of the characteristic types, the respective evaluation values may be calculated.

The information processing apparatus 10 acquires the image type and the priority information from the print job, acquires the characteristics of each image forming apparatus from each image forming apparatus 12, calculates the evaluation value of each image forming apparatus 12 in the image type and the priority information, and selects the image forming apparatus 12 having the highest evaluation value. In FIG. 11, an image forming apparatus 12C has the highest evaluation value, so that the information processing apparatus 10 selects the image forming apparatus 12C as a candidate.

The information processing apparatus 10 acquires the print schedule for performing the print job of each image forming apparatus 12, and determines whether the selected image forming apparatus 12C can perform the print job.

Figure 12:
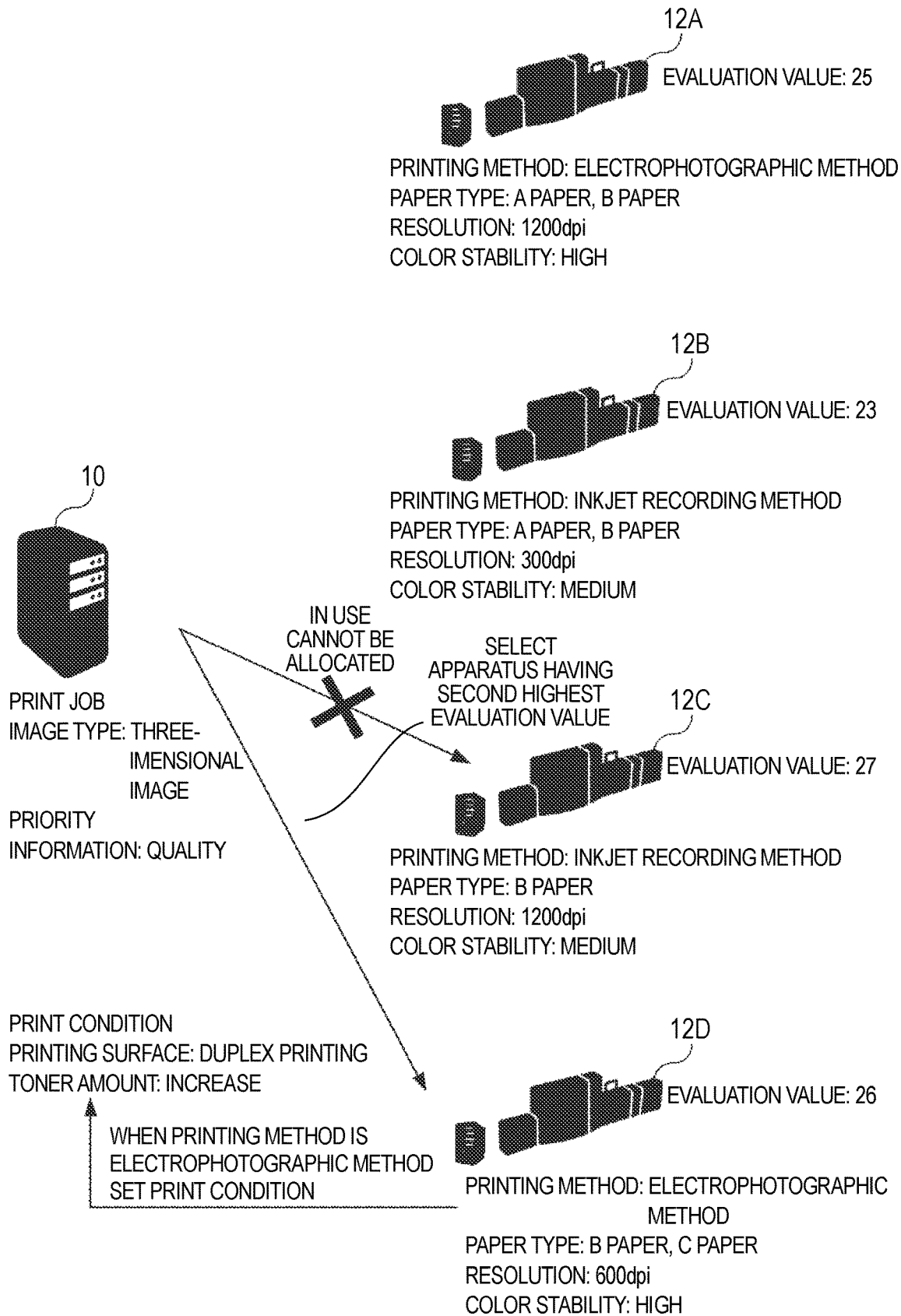
FIG. 12 is a schematic view illustrating an example of processing of selecting an image forming apparatus that illustrates a case of selecting an image forming apparatus having a second highest evaluation value according to the present exemplary embodiment.

As illustrated in FIG. 12, for example, as a result of referring to the print schedule of the image forming apparatus 12C, when the image forming apparatus 12C is in use and the print job cannot be allocated to the image forming apparatus 12C, the information processing apparatus 10 selects the image forming apparatus 12 having the second highest evaluation value. When the print job can be allocated to the image forming apparatus 12D, the information processing apparatus 10 determines the image forming apparatus 12D to be used as the apparatus to which the print job is allocated.

When the image type is the "three-dimensional image" and the determined printing method of the image forming apparatus 12 is the "electrophotographic method", the information processing apparatus 10 sets "duplex printing" and "increase in an amount of the toner" as a condition (hereinafter, referred to as a "print condition") for performing the print job. This is because, when the printing method is the "electrophotographic method", the amount of the toner and a range in which the toner permeates is increased to increase the amount of toner that permeates the paper and to improve the quality.

In the present exemplary embodiment, a mode has been described in which the print condition is set according to the characteristic type when the image type is the "three-dimensional image". However, the present invention is not limited thereto. The print condition may be set when the image type is the "three-dimensional image".

Specifically, when the image type is the "three-dimensional image", the number of pieces of paper corresponding to the paper type may be set as the print condition. For example, when the three-dimensional modeled object is modeled according to a height set in the three-dimensional image data, the number of slices is set according to a thickness of the paper. Therefore, the information processing apparatus 10 may calculate the number of pieces of the paper to be used for the print job according to the paper type and set the number of pieces of the paper as the print condition.

The print condition may be set according to the priority information. For example, when the printing method is the "electrophotographic method" and the priority information is the "quality", control may be performed for setting the print condition of the "duplex printing" and "increase in the amount of the toner", and when the printing method is the "electrophotographic method" and the priority information is the "cost", control may be performed for not setting the print condition.

Figure 13:
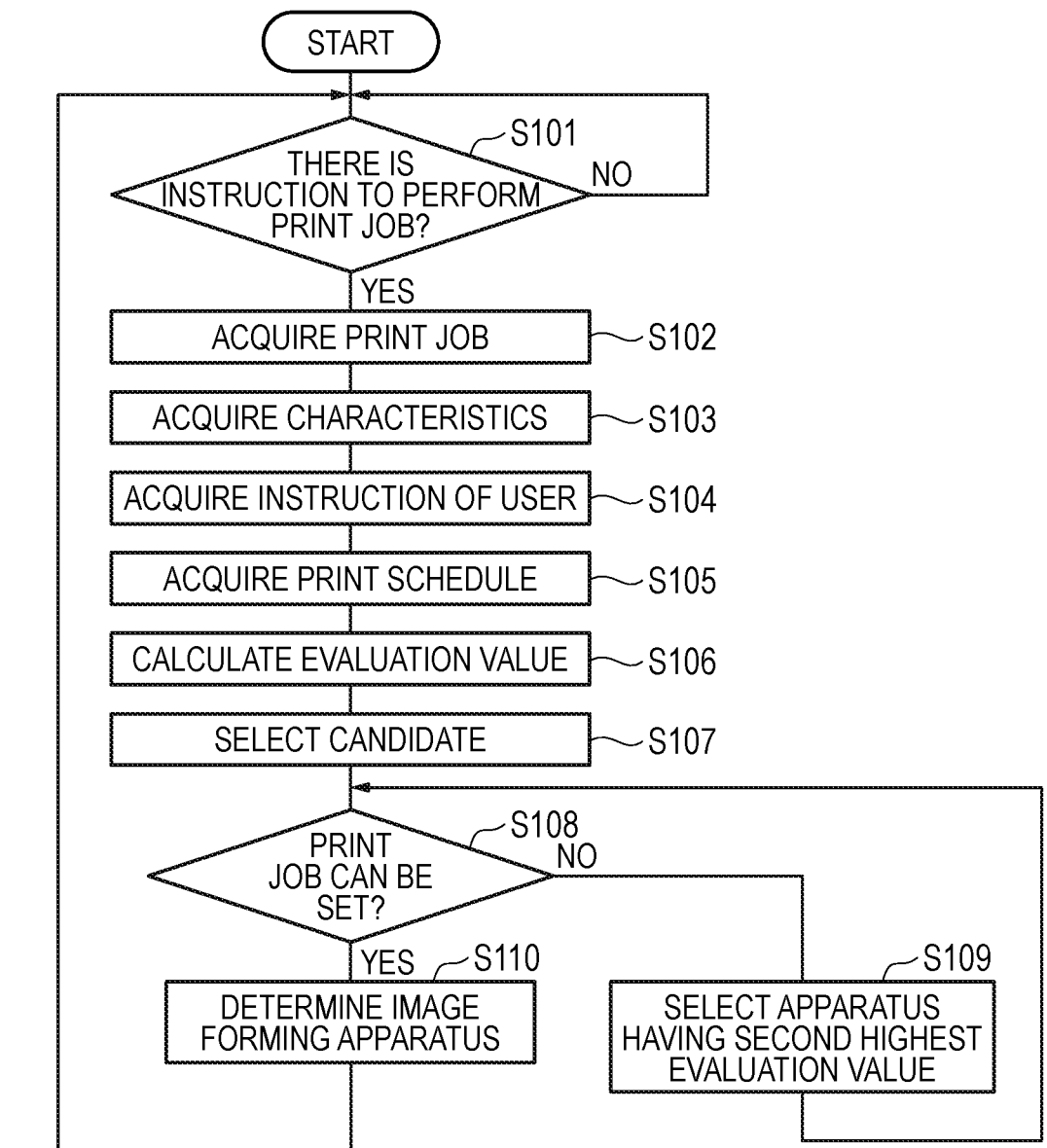
FIG. 13 is a flowchart showing an example of a processing procedure of an information processing program according to the present exemplary embodiment.

Next, the operation of the information processing apparatus 10 will be described with reference to FIG. 13. FIG. 13 is a flowchart showing an example of a processing procedure of an information processing program executed by the information processing apparatus 10. The information processing program is stored in a ROM 30B of the information processing apparatus 10. When an instruction to execute information processing is received from the user, the information processing program is read from the ROM 30B and executed by the CPU 30A of the information processing apparatus 10.

In step S101, the CPU 30A determines whether there is an instruction to perform the print job. When there is an instruction to perform the print job (step S101: YES), the CPU 30A proceeds to step S102. On the other hand, when there is no instruction to perform the print job (step S101: NO), the CPU 30A waits until there is an instruction to perform the print job.

In step S102, the CPU 30A acquires the print job.

In step S103, the CPU 30A acquires the characteristics of the image forming apparatus 12.

In step S104, the CPU 30A acquires an instruction of the user from the print job.

In step S105, the CPU 30A acquires the print schedule of the image forming apparatus 12.

In step S106, the CPU 30A calculates the evaluation value of the image forming apparatus 12 using the image type contained in the print job, the priority information contained in the instruction of the user, and the characteristics of the image forming apparatus 12.

In step S107, the CPU 30A selects a candidate of the image forming apparatus 12 that performs the print job from the calculated evaluation value.

In step S108, the CPU 30A determines whether the print job can be set in the selected image forming apparatus 12 with reference to the print schedule of the selected image forming apparatus 12. When the print job can be set in the selected image forming apparatus 12 (step S108: YES), the CPU 30A proceeds to step S110. On the other hand, when the print job cannot be set in the selected image forming apparatus 12 (step S108: NO), the CPU 30A proceeds to step S109.

In step S109, the CPU 30A selects a candidate of the image forming apparatus 12 having the second highest evaluation value next to the selected image forming apparatus 12.

In step S110, the CPU 30A determines the candidate of the image forming apparatus 12 to be used as the image forming apparatus 12 that performs the print job.

In step S111, the CPU 30A determines whether the image data contained in the print job is the three-dimensional image data. When the image data is the three-dimensional image data (step S111: YES), the CPU 30A proceeds to step S112. On the other hand, when the image data is not the three-dimensional image data (when the image data is the two-dimensional image data) (step S111: NO), the CPU 30A proceeds to step S116.

In step S112, the CPU 30A determines whether the printing method of the determined image forming apparatus 12 is the electrophotographic method. When the printing method is the electrophotographic method (step S112: YES), the CPU 30A proceeds to step S113. On the other hand, when the printing method is not the electrophotographic method (when the printing method is the inkjet recording method) (step S112: NO), the CPU 30A proceeds to step S114.

In step S113, the CPU 30A sets the condition of the duplex printing and the increase in the amount of the toner as the print condition of the print job.

In step S114, the CPU 30A calculates the number of slices according to the paper type. Here, in order to model the three-dimensional modeled object according to the height set in the three-dimensional image data, it is necessary to set the number of slices (the number of pieces of the paper) according to the thickness of the paper. The number of slices is calculated by dividing the height set in the three-dimensional image data by the thickness of the paper used for performing the print job.

In step S115, the CPU 30A sets the number of slices (the number of pieces of the paper) as the print condition of the print job.

In step S116, the CPU 30A transmits the print job to the image forming apparatus 12 that performs the print job.

In step S117, the CPU 30A determines whether to complete the information processing. When determining to complete the information processing (step S117: YES), the CPU 30A completes the information processing. On the other hand, when determining not to complete the information processing (step S117: NO), the CPU 30A proceeds to step S101.

As described above, according to the present exemplary embodiment, the image forming apparatus 12 is selected using the type of the image data contained in the print job, the instruction of the user, and the characteristics set in each image forming apparatus 12. Therefore, the appropriate printing apparatus is selected depending on the two-dimensional image and the three-dimensional modeled object.

In the present exemplary embodiment, a mode has been described in which the information processing apparatus 10 has a housing different from those of the DFE 11, the image forming apparatus 12, and the post-processing apparatus 13. However, the present invention is not limited thereto. The information processing apparatus 10 may be mounted on the DFE 11 to select the image forming apparatus 12 that performs the print job from the plurality of image forming apparatuses 12.

In the present exemplary embodiment, a mode has been described in which the image forming apparatus 12 is selected by calculating the evaluation value for each image forming apparatus 12 and quantitatively evaluating the image forming apparatus 12. However, the present invention is not limited thereto. For example, the condition for selecting the image forming apparatus 12 may be set according to the print job and the instruction from the user. Specifically, when the image type contained in the print job is the "three-dimensional image", the condition may be set such that the image forming apparatus 12 whose printing method is the "inkjet recording method" is preferentially selected. When the instruction of the user is information in which priority is given to the "quality", the condition may be set such that the image forming apparatus 12 whose paper type is the "C paper (thin)" is preferentially selected. A priority condition may be set according to a combination of the print job and the instruction of the user. Specifically, when the image type contained in the print job is the "three-dimensional image" and the instruction of the user is information in which priority is given to the "quality", the condition is set such that the image forming apparatus 12 whose printing method is the "inkjet recording method" is preferentially selected. When the image type contained in the print job is the "two-dimensional image" and the instruction of the user is information in which priority is given to the "quality", the condition is set such that the image forming apparatus 12 whose printing method is the "electrophotographic method" is preferentially selected.

If the plurality of image forming apparatuses 12 are listed as candidates when the condition for preferentially selecting the image forming apparatus 12 has been set, the evaluation values of the plurality of image forming apparatuses 12 may be calculated, and the image forming apparatus 12 may be selected using the evaluation values. Specifically, when the image type contained in the print job is the "three-dimensional image" and the instruction of the user is information in which priority is given to the "quality", the condition is set such that the image forming apparatus 12 whose printing method is the "inkjet recording method" is preferentially selected, and the candidates are selected. When the plurality of image forming apparatuses 12 are listed as the candidates, the evaluation value of each image forming apparatus 12 is calculated, and the image forming apparatus 12 having the highest evaluation value is selected. That is, the information processing apparatus 10 narrows down the candidates of the image forming apparatus 12 by setting the priority condition according to the combination of the print job and the instruction of the user, and selects the image forming apparatus 12 using the evaluation value.

In the present exemplary embodiment, a mode has been described in which the image type contained in the print job is the two-dimensional image or the three-dimensional image. However, the present invention is not limited thereto. Both the two-dimensional image and the three-dimensional image may be contained. In this case, among the evaluation values calculated using the two-dimensional image and the evaluation values calculated using the three-dimensional image, the highest evaluation value may be used as the evaluation value for selecting the printing apparatus that performs the print job, or priority order of the two-dimensional image and the three-dimensional image may be set in advance. The print job may be divided for each piece of the image data, and the printing apparatus that performs each print job may be selected.

In addition, the configuration of the DFE 11 described according to the above exemplary embodiment is an example, and may be changed depending on the situation without departing from the gist of the present invention.

The processing flow of the program described according to the above exemplary embodiment is also an example, and an unnecessary step may be deleted, a new step may be added, or the processing order may be changed without departing from the gist of the present invention.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiments, a mode has been described in which the information processing program has been stored (installed) in the ROM 30B in advance, but the present invention is not limited thereto. The program may be recorded in a recording medium which is a compact disc read only memory (CD-ROM), a digital versatile disc read only memory (DVD-ROM), a universal serial bus (USB) memory, or the like. The program may be downloaded from an external device via a network.

What is claimed is:

1. An information processing apparatus that is connected with a plurality of printing apparatuses via a network, the printing apparatuses including an electrophotographic printer and an inkjet printer, the information processing apparatus comprising:
    a memory storing a database containing evaluation information for selecting one of the printing apparatuses; and
    a processor,
    wherein the processor is configured to
       receive a print job for forming a two-dimensional image, a print job for forming a three-dimensional modeled object, and a user instruction giving priority to quality or cost in the print job for forming the three-dimensional modeled object,
       in response to receiving the print job for forming the three-dimensional modeled object and the user instruction giving the priority to the quality in the print job for forming the three-dimensional modeled object, access the database and, based on the evaluation information stored in the database, set duplex printing and an increase in toner in printing conditions of the print job for forming the three-dimensional modeled object, and
       transmit, to the electrophotographic printer, the print job for forming the three-dimensional modeled object to which the duplex printing and the increase in toner are set in the printing conditions.

2. The information processing apparatus according to claim 1,
    wherein the processor is configured to set one or more of the printing conditions of the received print job differently based on whether the received print job is for forming the two-dimensional image or for forming the three-dimensional modeled object.

3. The information processing apparatus according to claim 2,
wherein the processor is configured to, when the received print job is for forming the three-dimensional modeled object, set number of recording media used in the print job for forming the three-dimensional modeled object as the print condition.

4. The information processing apparatus according to claim 1,
wherein the processor is configured to select the printing apparatus for the print job based on an evaluation value calculated by adding a predetermined value for each type of the received print job for forming the two-dimensional image or for forming the three-dimensional modeled object and for each piece of attribute information of the printing apparatuses stored in the database.

5. The information processing apparatus according to claim 2,
wherein the processor is configured to select the printing apparatus for the print job based on an evaluation value calculated by adding a predetermined value for each type of the received print job for forming the two-dimensional image or for forming the three-dimensional modeled object and for each piece of attribute information of the printing apparatuses stored in the database.

6. The information processing apparatus according to claim 4,
wherein the processor is configured to set the predetermined value according to the user instruction.

7. The information processing apparatus according to claim 5,
wherein the processor is configured to set the predetermined value according to the user instruction.

8. The information processing apparatus according to claim 6,
wherein, the processor is configured to set, in response to receiving the print job for forming the three-dimensional modeled object and the user instruction giving the priority to the quality in the print job for forming the three-dimensional modeled object, the predetermined value related to the attribute information to be larger as paper corresponding to a paper type in the attribute information is thinner.

9. The information processing apparatus according to claim 7,
wherein, the processor is configured to set, in response to receiving the print job for forming the three-dimensional modeled object and the user instruction giving the priority to the quality in the print job for forming the three-dimensional modeled object, the predetermined value related to the attribute information to be larger as paper corresponding to a paper type in the attribute information is thinner.

10. The information processing apparatus according to claim 1,
wherein the processor is configured to vary a printing apparatus to be preferentially selected according to a combination of whether the received print job is for forming the two-dimensional image or for forming the three-dimensional modeled object and the user instruction.

11. The information processing apparatus according to claim 10,
wherein, the processor is configured to preferentially select, in response to receiving the print job for forming the three-dimensional modeled object and the user instruction giving the priority to the quality in the print job for forming the three-dimensional modeled object the inkjet printer.

12. The information processing apparatus according to claim 1,
wherein the processor is configured to further acquire information on a print job scheduled to be performed by each of the printing apparatuses, and select the printing apparatus according to the acquired information on the print job and the print job.

13. The information processing apparatus according to claim 2,
wherein the processor is configured to further acquire information on a print job scheduled to be performed by each of the printing apparatuses, and select the printing apparatus according to the acquired information on the print job and the print job.

14. The information processing apparatus according to claim 4,
wherein the attribute information indicates at least one of a printing method, a paper type, resolution, and color stability.

15. The information processing apparatus according to claim 5,
wherein the attribute information indicates at least one of a printing method, a paper type, resolution, and color stability.

16. A non-transitory computer readable medium storing an information processing program that causes a computer, that is connected with a plurality of printing apparatuses via a network, the printing apparatuses including an electrophotographic printer and an inkjet printer, to:
store in a memory a database containing evaluation information for selecting one of the printing apparatuses;
receive a print job for forming a two-dimensional image, a print job for forming a three-dimensional modeled object, and a user instruction giving priority to quality or cost in the print job for forming the three-dimensional modeled object;
in response to receiving the print job for forming the three-dimensional modeled object and the user instruction giving the priority to the quality in the print job for forming the three-dimensional modeled object, access the database and, based on the evaluation information stored in the database, set duplex printing and an increase in toner in printing conditions of the print job for forming the three-dimensional modeled object; and
transmit, to the electrophotographic printer, the print job for forming the three-dimensional modeled object to which the duplex printing and the increase in toner are set in the printing conditions.

17. A three-dimensional modeling system comprising:
the information processing apparatus according to claim 1;
an image forming apparatus configured to form an image on a recording medium according to image data; and
a three-dimensional modeling post-processing apparatus configured to perform post-processing for three-dimensional modeling on the recording medium on which the image has been formed.

* * * * *